United States Patent
Mayraz Matosevich et al.

(10) Patent No.: US 12,093,555 B2
(45) Date of Patent: Sep. 17, 2024

(54) MANAGING HOST CONNECTIVITY DURING NON-DISRUPTIVE MIGRATION IN A STORAGE SYSTEM

(71) Applicant: Dell Products L.P., Round Rock, TX (US)

(72) Inventors: Rivka Mayraz Matosevich, Zichron Ya'acov (IL); Mark J. Halstead, Holliston, MA (US); Adnan Sahin, Needham, MA (US); Michael E. Specht, Conway, NH (US)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 17/728,488

(22) Filed: Apr. 25, 2022

(65) Prior Publication Data

US 2023/0342059 A1 Oct. 26, 2023

(51) Int. Cl.
G06F 3/06 (2006.01)

(52) U.S. Cl.
CPC .......... *G06F 3/0647* (2013.01); *G06F 3/0604* (2013.01); *G06F 3/0659* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 7,805,566 | B2* | 9/2010 | Abouelwafa | G06F 3/067 709/239 |
| 11,461,031 | B1* | 10/2022 | Moran | G06F 3/0604 |
| 2007/0239954 | A1* | 10/2007 | Sakashita | G06F 3/067 711/170 |
| 2013/0212345 | A1* | 8/2013 | Nakajima | G06F 3/0619 711/161 |
| 2014/0040410 | A1* | 2/2014 | McDowell | G06F 3/0647 709/212 |
| 2018/0181328 | A1 | 6/2018 | Espeseth et al. | |
| 2020/0250085 | A1* | 8/2020 | Li | G06F 12/00 |

OTHER PUBLICATIONS

U.S. Appl. No. 17/728,606 filed in the name of Adnan Sahin et al. filed Apr. 25, 2022, and entitled "Load Balancing Using Storage System Driven Host Connectivity Management."

(Continued)

*Primary Examiner* — Stephanie Wu
(74) *Attorney, Agent, or Firm* — Ryan, Mason & Lewis, LLP

(57) ABSTRACT

A first storage system receives a request to migrate a volume from the first storage system to a second storage system, and commences a migration process to non-disruptively migrate the volume from the first storage system to the second storage system while the volume is being accessed by a host system. The first storage system sends a first request to the host system to discover information for connecting to the second storage system to allow the host system to access to the volume through the second storage system during the migration process. In addition, the first storage system sends a second request to the host system to discover information for disconnecting from the first storage system during a final stage of the migration process.

20 Claims, 10 Drawing Sheets

(56) References Cited

OTHER PUBLICATIONS

NVM Express, NVM Express, Revision 1.3, NVM Express, May 1, 2017, 282 pages.
E. Smith, "Introducing Target Driven Zoning (TDZ)," https://brasstacksblog.typepad.com/brass-tacks/2012/01/introducing-target-driven-zoning-tdz.html, Jan. 16, 2012, 10 pages.
N. Dyer, "NimbleOS 5.2: Simplify Fibre Channel Deployments with Target Driven Zoning (SmartSAN)," https://community.hpe.com/t5/Around-the-Storage-Block/NimbleOS-5-2-Simplify-Fibre-Channel-Deployments-with-Target/ba-p/7090929#.Ydh1DWjMKUk, Jun. 11, 2020, 12 pages.
R. Mohan, "Fibre Channel SAN Automation and Orchestration," https://fibrechannel.org/fibre-channel-san-automation-and-orchestration/, Accessed Sep. 14, 2021, 6 pages.
U.S. Appl. No. 17/482,935 filed in the name of Rivka Matosevich et al. filed Sep. 23, 2021, and entitled "Generation of Host Connectivity Plans with Load Balancing and Resiliency."

\* cited by examiner

300

300-2

300-3

MANAGING HOST CONNECTIVITY DURING NON-DISRUPTIVE MIGRATION IN A STORAGE SYSTEM

TECHNICAL FIELD

This disclosure relates generally to storage systems and, more specifically, to techniques to performing non-disruptive migration in a storage system.

BACKGROUND

In general, data migration is a process of transferring data from one storage system to another storage system. Data migration is utilized to, e.g., migrate data from one type of storage media to another type of storage media, migrate a database between different database systems, migrate application data between different computing systems/platforms, migrate data between data centers, migrate on-premises data to a cloud system, etc. Typically, data migration is performed in a computing environment in which applications cannot be taken offline for, e.g., cutover to a new storage system. In this regard, non-disruptive migration techniques are utilized to perform on-line data migrations which are non-disruptive to a given host or application. For example, the non-disruptive migration of a given volume from a source storage system to a target storage system avoids disruption in application input/output (I/O) operations to the migrating volume by exposing an identity of the migrating volume through both the source and target storage systems.

A conventional non-disruptive migration process requires a user to (i) manually connect a host to a target storage system to allow the host to access the migrating volume through the target storage system (e.g., an administrator performs a host rescan to allow the host to discover one or more paths to the migrating volume on the target storage system) as well as the source storage system during the non-disruptive migration process, and (ii) manually disconnect the host from one or more ports of the source storage system (during a final stage of the migration process) that were used to access the given volume on the source storage system. The need for manual operations to manage and update host connectivity to the source and target storage systems can result in user errors which cause, e.g., loss of host access to the migrating volume due to the inability of the host to access the migrating volume through the target storage system, or loss of host access to other volumes on the source storage system when the connections to the source storage system which should remain are inadvertently removed. In addition, the update to the host connectivity requires the user to access both the source and target storage systems, which adds further complication to the non-disruptive migration process flow.

SUMMARY

Exemplary embodiments of the disclosure include techniques for implementing non-disruptive migration in which a storage system-driven host connectivity management process is utilized to control host connections to source and target storage systems during the non-disruptive migration process. In an exemplary embodiment, a first storage system receives a request to migrate a volume from the first storage system to a second storage system. The first storage system commences a migration process to non-disruptively migrate the volume from the first storage system to the second storage system while the volume is being accessed by a host system. The first storage system sends a first request to the host system to discover information for connecting to the second storage system to allow the host system to access to the volume through the second storage system during the migration process. In another exemplary embodiment, the first storage system sends a second request to the host system to discover information for disconnecting from the first storage system during a final stage of the migration process.

Other embodiments of the disclosure include, without limitation, apparatus and articles of manufacture comprising processor-readable storage media, which are configured for implementing non-disruptive migration in which a storage system-driven host connectivity management process is utilized to control host connections to source and target storage systems during the non-disruptive migration process.

DETAILED DESCRIPTION

Exemplary embodiments of the disclosure will now be discussed in further detail with regard to systems and methods implementing non-disruptive migration in which a storage system-driven host connectivity management process is utilized to control host connections to source and target storage systems during the non-disruptive migration process. For purposes of illustration, exemplary embodiments will be described herein with reference to exemplary network computing systems, such as distributed storage systems, which implement data processing systems and associated computers, servers, storage devices and other processing devices. It is to be appreciated, however, that these and other embodiments are not restricted to the particular illustrative system and device configurations shown. Accordingly, the term "network computing system" as used herein is intended to be broadly construed, so as to encompass, for example, processing systems comprising cloud computing and storage systems, as well as other types of processing systems comprising various combinations of physical and virtual processing resources. A network computing system may therefore comprise, for example, at least one data center or other cloud-based systems that include one or more cloud systems that host multiple tenants which share cloud resources. Numerous different types of enterprise computing and storage systems are also encompassed by the term "network computing system" as that term is broadly used herein.

Figure 1:
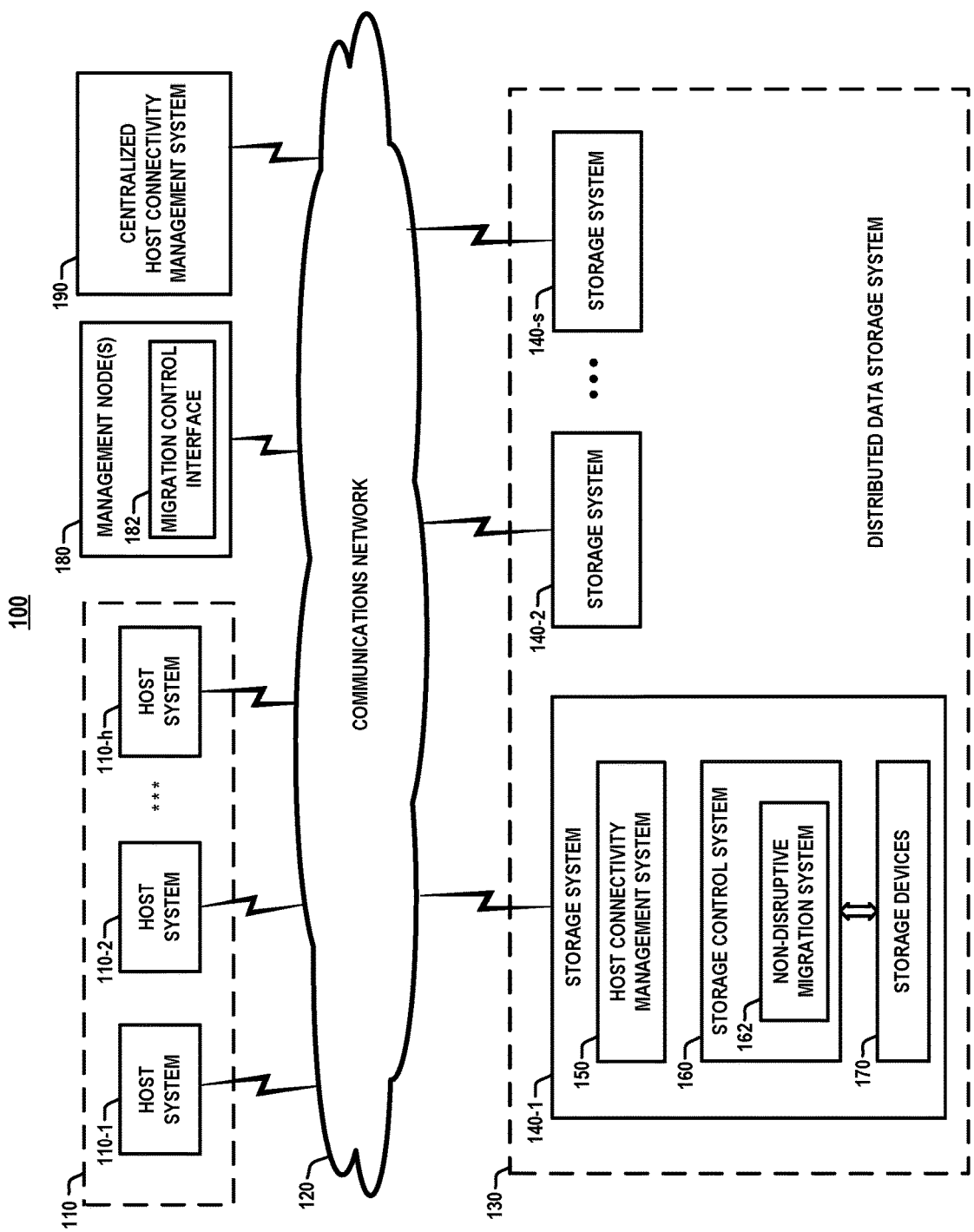
FIG. 1 schematically illustrates a network computing system which is configured to utilize a storage system-driven host connectivity management process for controlling host connections to source and target storage systems during a non-disruptive migration process, according to an exemplary embodiment of the disclosure.

FIG. 1 schematically illustrates a network computing system which is configured to utilize a storage system-driven host connectivity management process for controlling host connections to source and target storage systems during a non-disruptive migration process, according to an exemplary embodiment of the disclosure. In particular, FIG. 1 schematically illustrates a network computing system 100 which comprises one or more host systems 110-1, 110-2, . . . 110-*h* (collectively, host systems 110), a communications network 120, and a distributed data storage system 130. The distributed data storage system 130 comprises one or more storage systems 140-1, 140-2, . . . , 140-*s* (collectively, storage systems 140). As shown in FIG. 1, the storage system 140-1 comprises a host connectivity management system 150 (e.g., comprising a local discovery controller), a storage control system 160, and a plurality of storage devices 170. In some embodiments, each storage control system 160 implements a non-disruptive migration system 162, the functions of which will be explained in further detail below. In some embodiments, the other storage systems 140-2 . . . 140-*s* have the same or similar configuration as the storage system 140-1 shown in FIG. 1. In addition, the network computing system 100 further comprises one or more management nodes 180, and in some embodiments, a centralized host connectivity management system 190, the functions of which will be explained in further detail below.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of network computing systems or information processing systems comprising multiple computing nodes associated with respective users. The host systems 110 issue data access requests to the distributed data storage system 130, wherein the data access requests include (i) write requests to store data in one or more of the storage systems 140 and (ii) read requests to access data that is stored in one or more of the storage systems 140.

The host systems 110, or applications running on the host systems 110, are configured to access the storage systems 140 through the communications network 120. While the communications network 120 is generically depicted in FIG. 1, it is to be understood that the communications network 120 may comprise any known communications network such as, a global computer network (e.g., the Internet), a wide area network (WAN), a local area network (LAN), a wireless network such as Wi-Fi or WiMAX, a storage fabric (e.g., IP-based or Fibre Channel (FC) storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication over switched fabric topology using, e.g., Transfer Control Protocol/Internet Protocol (TCP/IP) or other communication protocols such as a Fibre Channel (FC) protocol, a Fibre Channel over Ethernet (FCoE) protocol, a Non-Volatile Memory Express over Fabrics (NVMe-oF) protocol, an Internet Small Computer System Interface (iSCSI) protocol, InfiniBand, Gigabit Ethernet, etc., to implement I/O channels and support storage network connectivity. Numerous alternative networking arrangements are possible in a given embodiment, as will be appreciated by those skilled in the art. For example, in some embodiments, the communications network 120 comprises a converged network comprising a switched fabric IP network comprising LAN switches and storage area network (SAN) switches.

The distributed data storage system 130 may comprise any type of data storage system, or combinations of data storage systems, which comprises software-defined storage, clustered or distributed virtual and/or physical infrastructure. In some embodiments, the distributed data storage system 130 comprises a dynamic scale-out data storage system which allows additional storage systems 140 to be added to scale the performance and storage capacity of the distributed data storage system 130. In some embodiments, each storage system 140 comprises one or more storage arrays, e.g., solid-state drive (SSD) arrays, flash storage arrays, hard-disk drive (HDD) arrays, or combinations thereof. In some embodiments, the storage systems 140 comprise NVMe storage arrays. The storage systems 140 can be configured for block-based storage, file-based storage, or object storage, or a combination thereof. For example, in some embodiments, the storage systems 140 are configured to implement block storage which is accessed using block-based protocols such as FC, FCoE, iSCSI, NVMe, etc. In this regard, the term "storage system" as used herein should be broadly construed and not viewed as being limited to storage systems of any particular type or types.

In some embodiments, each storage system 140 is implemented on a machine, e.g., a physical server machine or storage appliance, which comprises hardware processors, system memory, and other hardware resources that execute software and firmware to implement the functionality of the storage system 140, the host connectivity management system 150, and the storage control system 160. In some embodiments, the storage systems 140 comprise enterprise-class storage systems having multi-controller architectures which execute controller logic. Each storage system 140 executes an operating system (e.g., a customized lightweight Linux kernel), controller logic, and software (e.g., software-defined storage software) to implement various functions of the storage system 140.

The storage devices 170 of the storage systems 140 comprise one or more of various types of storage device such as HDDs, SSDs, Flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices 170 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices 170 may be implemented in each storage system 140. In this regard, the term "storage device" as used herein should be broadly construed to encompass all types of persistent storage media including hybrid drives. On a given storage system 140, the storage control system 160 communicates with the storage devices 170 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), SCSI, serial attached SCSI (SAS), peripheral component interconnect express (PCIe), etc.

In some embodiments, the storage control systems 160 of the storage systems 140 are configured to implement various data management services and functions. For example, in some embodiments, the data management services and functions comprises a storage virtualization management system which is configured to create and manage storage volumes by aggregating the capacity of storage devices 170 of a given storage system 140, or multiple storage systems 140, into one or more virtual storage pools from which logical volumes are allocated, wherein the logical volumes (e.g., a block unit of storage management) are identified by, e.g., logical unit numbers (LUNs) that are exposed as block devices, to the applications or host systems 110 which consume the data. A given storage volume can be generated which spans across a two or more of the storage systems 140. Furthermore, a virtual block device can correspond to a volume of a storage pool. Each virtual block device comprises any number of actual physical storage devices, wherein each block device is preferably homogeneous in terms of the type of storage devices that make up the block device (e.g., a block device can include only HDD devices or SSD devices, etc.).

Furthermore, in addition to data migration services provided by the non-disruptive migration systems 162, the storage control systems 160 are configured to perform various other data management and storage services including, but not limited to, inline data compression/decompression, deduplication, thin provisioning, and data protection functions such as data replication, snapshots, Reed-Solomon error correction coding, and other data protection schemes based on data striping and parity (e.g., RAID), and other types of data management functions, depending on the system configuration.

The non-disruptive migration system 162 on each storage system 140 implements methods to support, e.g., non-disruptive migration of data between the storage systems 140, or migration of data between storage arrays within a given storage system 140. In some embodiments, the non-disruptive migration system 162 utilizes data replication techniques to move data from a source storage system to a target storage system. Furthermore, in some embodiments, the non-disruptive migration system 162 leverages the host connectivity management system 150 to manage and control host connectivity during a non-disruptive migration process, the details of which will be explained in further detail below.

In some embodiments, each storage system 140-1, 140-2, . . . , 140-s comprises a local host connectivity management system 150 to enable the host systems 110 to discover and connect to the storage systems 140-1, 140-2, . . . , 140-s. In some embodiments, the host connectivity management system 150 comprises a discovery service that implements a local discovery controller to which a given host system 110 can connect to obtain connectivity information that is needed for the given host system 110 to connect to a given storage system 140. In some embodiments, each local host connectivity management system 150 is configured to provide a "referral" to another local host connectivity management system 150 on another storage system 140. An exemplary embodiment of the host connectivity management system 150 will be discussed in further detail below in conjunction with FIG. 2.

The management nodes 180 implement application programming interfaces (APIs) to enable manual, automated, and/or semi-automated configuration, provisioning, and monitoring of the distributed data storage system 130 and the associated storage systems 140. For example, in some embodiments, as shown in FIG. 1, the management nodes 180 implement a migration control interface 182 which is used to commence and configure migration operations that are performed by the non-disruptive migration systems 162 of the storage systems 140. For example, in some embodiments, an administrator can utilize the migration control interface 182 to setup and commence a non-disruptive migration process to migrate a storage volume from a source storage system to a target storage system using the non-disruptive migration systems 162 of the source and target storage systems. In other embodiments, a control process (e.g., automatic load balancing control process) can utilize the migration control interface 182 to automatically setup and commence a non-disruptive migration process to migrate a storage volume from a source storage system to a target storage system using the non-disruptive migration systems 162 of the source and target storage systems. In some embodiments, the management nodes 180 comprise standalone dedicated management nodes, which may comprise physical and/or virtual servers.

Moreover, in some embodiments, the network computing system 100 implements the centralized host connectivity management system 190. The centralized host connectivity management system 190 implements methods that are configured to perform various functions for managing and controlling the connectivity of the host systems 110 to the storage systems 140 of the distributed data storage system 130. In some embodiments, the centralized host connectivity management system 190 comprises a discovery service that implements a centralized discovery controller to which a given host system 110 can connect to obtain connectivity information that is needed for the given host system 110 to connect to one or more of the storage systems 140.

In some embodiments, the centralized host connectivity management system 190 operates in conjunction with the local host connectivity management systems 150 of the storage systems 140, wherein each local host connectivity management system 150 registers with the centralized host connectivity management system 190, and provides discovery information (via a push or pull messing protocol) with regard to the storage systems 140 to enable a centralized discovery system. In this instance, the centralized host connectivity management system 190 aggregates the connectivity information of all the storage systems 140 in the distributed data storage system 130, and allows a given host system 110 to connect to and register with the centralized host connectivity management system 190 to discover the storage systems 140 and obtain information for connecting to one or more of the storage systems 140. In some embodiments, the centralized host connectivity management system 190 executes standalone (e.g., as a virtual machine) on one or more server nodes apart from the one or more management nodes 180. In some, the centralized host connectivity management system 190 is a software-based entity that runs as a virtual machine or as an embedded container on a fabric.

Figure 2:
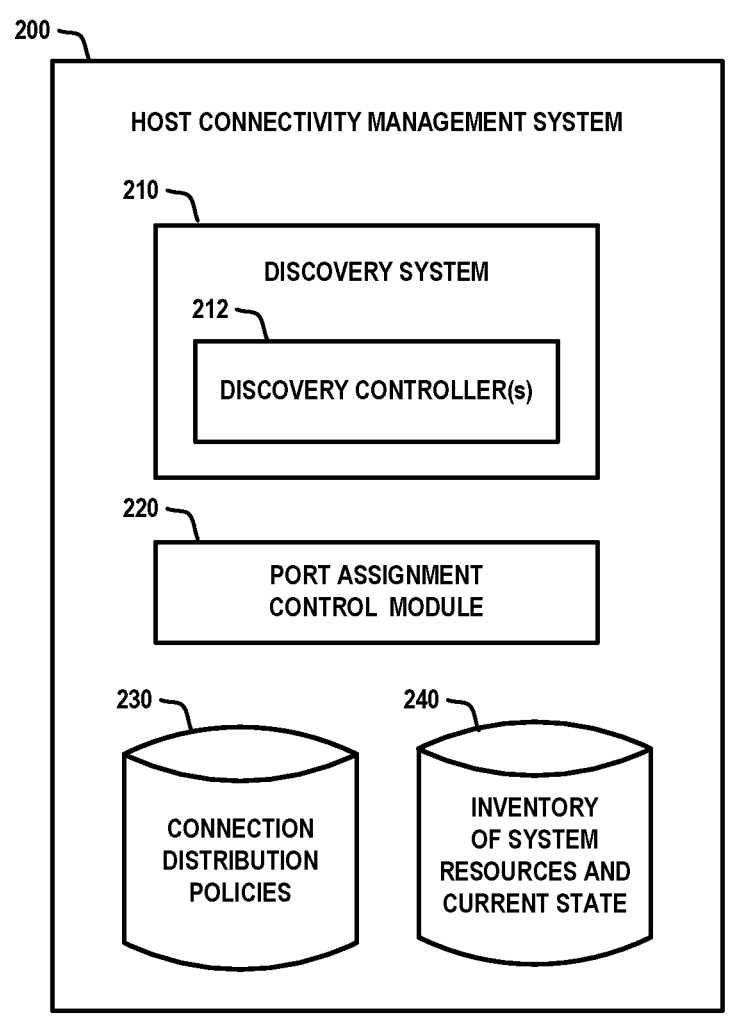
FIG. 2 schematically illustrates a host connectivity management system which is utilized to control host connections to source and target storage systems during a non-disruptive migration process, according to an exemplary embodiment of the disclosure.

FIG. 2 schematically illustrates a host connectivity management system which is utilized to control host connections to source and target storage systems during a non-disruptive migration process, according to an exemplary embodiment of the disclosure. More specifically, FIG. 2 schematically illustrates a host connectivity management system 200 comprising a discovery system 210, a port assignment control module 220, a datastore of connection distribution policies 230, and a datastore of information regarding a current inventory of storage system resources and a current state of such resources 240. In some embodiments, the host connectivity management system 200 illustrates an exemplary configuration of the local host connectivity management systems 150 which reside on the storage systems 140 (FIG. 1) or the centralized host connectivity management system 190.

The discovery system 210 implements a discovery service that is configured to discover constituent logical and physical elements of the storage environment and a current configuration of such discovered elements. The discovery system 210 is configured to provision one or more discovery controllers 212 to which hosts are connected to discover information that is utilized by the hosts to connect to storage systems in the data storage system. In some embodiments, the host connectivity management system 200 and associated discovery system 210 are configured as a target endpoint which is assigned to a specific IP address and port which allows the host systems to connect to the host connectivity management system 200. The discovery system 210 can be implemented using dynamic discovery services including, but not limited to, an NVMe-oF discovery protocol, an iSCSI SendTargets discovery protocol, a Fibre Channel Target Driven Zoning protocol, etc., depending on the given storage system environments. In other embodiments, control path methods can be implemented to allow the host system to communicate with the host connectivity management system 200 and obtain the port assignment and connection information through a control interface such as command-line interface (CLI). In such embodiments, the connection information is transferred to the host systems through some mechanism such as manually or through an orchestration infrastructure.

The various functions of the discovery system 210 will vary depending on whether the host connectivity management system 200 is a local system that resides on a storage system, or a centralized system that resides, e.g., in a switch or node in the storage fabric. For example, if the host connectivity management system 200 is a local system that resides on a given storage system, the discovery system 210 will track a current state and configuration of the given storage system, as well as port connectivity information (e.g., allocated I/O controllers, available volumes/namespaces, ports IDs of used and available ports for connecting to the storage system, etc.), and maintain such information in the datastore 240. On the other hand, if the host connectivity management system 200 is a centralized system, the discovery system 210 is configured to obtain or otherwise discover information regarding the hosts and storage systems connected to a given storage fabric within the storage environment.

More specifically, a centralized discovery service allows a host to automatically determine which storage systems on the storage fabric the host can access. The centralized discovery service allows a host to discover a list of storage systems (e.g., NVMe subsystems) with volumes/namespaces that are accessible to the host, allows the storage systems to discover a list of hosts that are on the storage fabric, allows a host to discover multiple paths to given storage system, etc. The centralized discovery service maintains a discovery log that collects data about the hosts and subsystems on the storage fabric, and provides a single point of contact for hosts and storage systems to utilize to discover each other on the storage fabric. The hosts and storage systems can be configured to access an IP address of the centralized discovery service, and the centralized discovery service serves as a broker for the communication between the hosts and storage systems.

In some embodiments, the centralized discovery system communicates with the local discovery systems of the storage systems (via a push or pull messaging mechanism) on a periodic or continuous basis to determine information such as a current inventory of available resources, the current operational states of the storage systems (active, inactive, failed, etc.), the I/O load on the storage systems, the type of I/O load on the storage systems (e.g., read intensive loads, or write intensive loads), the number of host system connections to each of the ports of the storage systems, etc. In some embodiments, depending on the type of storage environment and associated architecture, the centralized discovery service is configured to automatically discover elements such as, e.g., initiator endpoints (e.g., host systems such as application servers, etc.), target endpoints (e.g., storage nodes, storage controller nodes, namespaces, volumes, etc.), elements of a storage fabric (e.g., fabric infrastructure such as switches, ports, etc.), and a current configuration of such elements. For example, for initiator endpoints (e.g., host systems) and target endpoints (e.g., storage node), the configuration information can include an endpoint identifier and type (e.g., application server, storage system), the transport protocol information (e.g., protocol type, address, etc.), fabric port (e.g., Ethernet interface), a fabric address (e.g., IP address, logical port, etc.). For storage fabric elements, the configuration information can include information such as fabric type (port-based fabric, addressable fabric, etc.) and other relevant configuration information with regard to, e.g., components of the storage fabric (e.g., fabric infrastructure such as switches, ports, etc.). The centralized discovery service maintains and continually updates an inventory of the discovered storage system resources in the datastore 240.

The port assignment control module 220 implements methods that are configured to determine a recommended connection (e.g., a subset of ports) for a given host system based on various criteria including, but not limited to, a current state of the system resources, a current or updated inventory of system resources (as maintained in the datastore 240) and one or more connection distribution policies (as maintained in datastore 230). The information regarding a current state of the system resources includes, but is not limited to, the available storage systems and their current state, the load experienced by the storage systems (current load or historically), the current state of port connectivity of host systems to the storage systems, the I/O load (currently or historically) associated with data access requests from the host systems, etc.

The connection distribution policies specify criteria for distributing the host system connections to the available ports of the storage systems. For example, a connection distribution policy may specify that there be an equal distribution of host system connections over the storage systems of the storage system. For example, the connection distribution policy can specify a port assignment which provides an equal distribution of host system connections over the storage systems and the ports of the storage systems. Another connection distribution policy may specify that the host system connections are distributed in proportion to some system resource, e.g., CPU, memory, network, etc. Another connection distribution policy may specify a distribution which achieves an equal distribution of an average I/O load of the host systems over the storage systems. Another connection distribution policy may specify that a distribution which achieves a distribution of the average I/O load of the host systems in proportion to some system resource, e.g., processor resources (e.g., CPUs), memory resources, network resources, etc.

The port assignment control module 220 utilizes the above information to determine a subset of ports (among all the available ports of the storage systems in the data storage system) to assign to the host system and allow the host system to connect to the one or more data storage systems using some or all of the assigned ports. The port assignment control module 220 provides the recommended connectivity for a given host system to the discovery system 210, and the discovery system 210 provides the recommended connection information to the host system. The recommended connectivity (e.g., number of ports) may be different between different host systems depending on the specific requirements of the host systems (e.g., I/O throughput), and a new recommended connectivity may be provided to a given host system in response to a change in the requirements of the host system.

With this scheme, a host system does not need knowledge on how to connect, or otherwise need to determine how to connect, to a given storage system. Instead, the recommended connection information that is returned to the host system from the host connectivity management system 200 specifies how the host system should connect to the data storage system. This is in contrast to conventional schemes in which the host system (e.g., application server), through a discovery request, is provided a list of all available ports and paths to all storage volumes in a data storage system, where the host system is required to determine which ports and paths to use for connection to the data storage system and storage volumes of the storage nodes. The exemplary embodiments of the disclosure as described herein limit the returned paths to a set that the host system should use, thereby removing the dependency on the host system having to handle the returned path list. In the context of non-disruptive migration, the port assignment control module 220 executes control logic to determine which port(s) of a target storage system the host should connect to for accessing a migrating volume, and which port(s) of a source storage system the host should disconnect from to complete the migration process.

In some embodiments, the host system connection to the discovery system 210 is a temporary connection whereby the host system disconnects from the discovery system 210 after receiving connectivity information. In other embodiments, a persistent discovery controller mechanism is implemented in which the host system maintains a persistent connection with a discovery controller 212 of the discovery system 210 after receiving the initial connectivity information, and while the host system is connected to the storage system. The persistent connection allows the discovery system 210 to push notifications to the host system when certain events occur, e.g., when there are changes in the system resources and/or state (e.g., storage node(s) added/removed/failed, changes in fabric configuration, etc.). For example, in the context of NVMe-oF, a persistent discovery controller can be configured to send asynchronous event notification (AEN) to a host system connected to the persistent discovery controller to provide notification of such events. In response to receiving such notifications, the host system can issue new discovery requests to obtain updated connection information (e.g., updated port assignments) as desired. Moreover, in the context of non-disruptive migration, the persistent connection allows the host connectivity management system 200 to push updated connection information to a given host system to allow the host to connect to one or more ports of a target storage system and disconnect from one or more ports of a source storage system, and thereby automate and control host connectivity during a non-disruptive migration process.

Figure 3A:
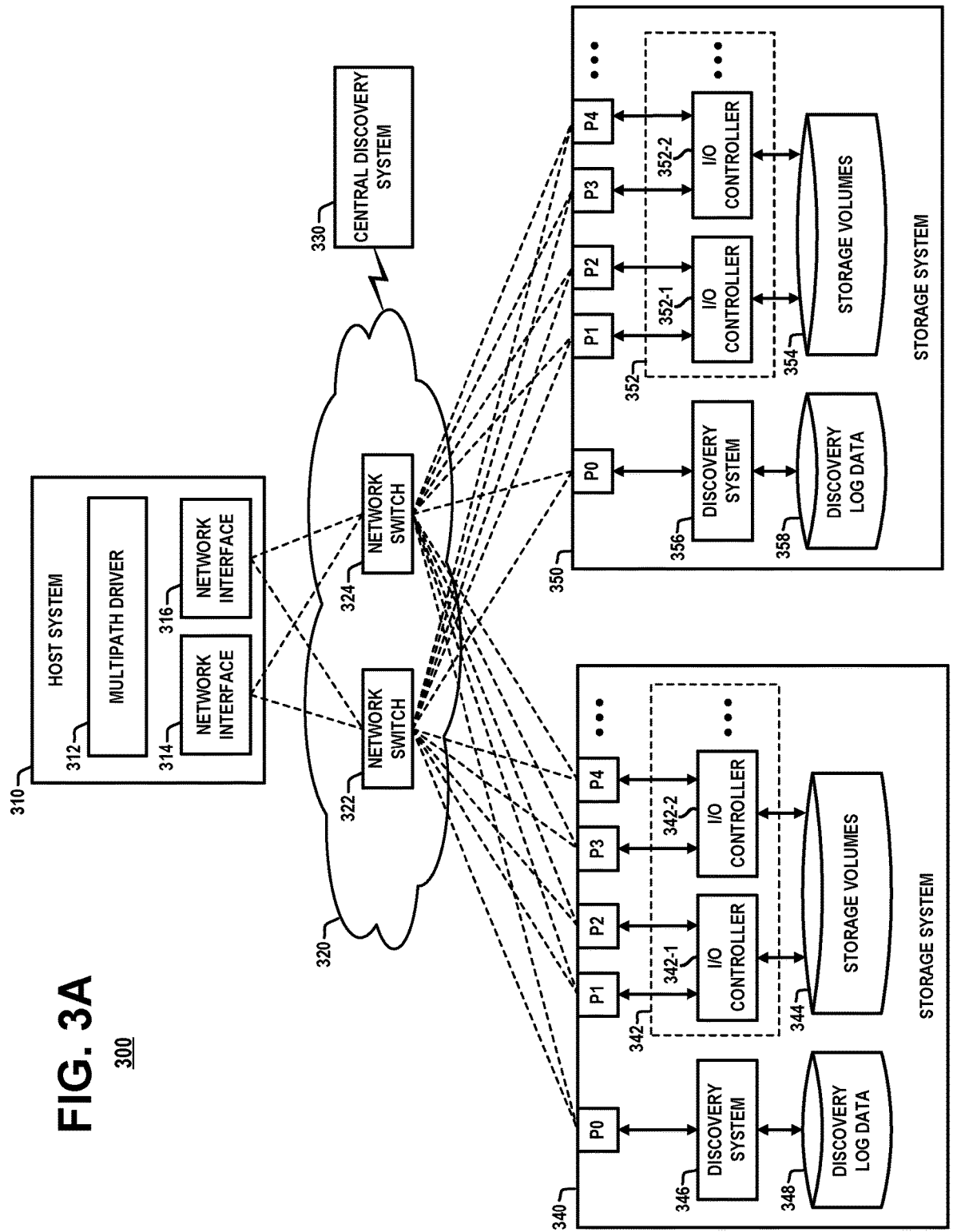
FIGS. 3A, 3B, 3C, and 3D schematically illustrate a non-disruptive migration process in which a host connectivity management system is utilized to automatically manage host connections to source and target storage systems as part of the non-disruptive migration process, according to an exemplary embodiment of the disclosure.

FIGS. 3A, 3B, 3C, and 3D schematically illustrate a non-disruptive migration process in which a host connectivity management system is utilized to automatically manage host connections to source and target storage systems as part of the non-disruptive migration process, according to an exemplary embodiment of the disclosure. In particular, FIG. 3A schematically illustrates a network computing environment 300 comprising a host system 310, a storage network 320 comprising network switches 322 and 324, a central discovery system 330, and storage systems 340 and 350. The host system 310 comprises a multipath driver 312 and network interfaces 314 and 316 (providing two ports). The storage system 340 comprises a plurality of ports P0, P1, P2, P3, and P4, a plurality of I/O controllers 342 (including at least a first I/O controller 342-1, and a second I/O controller 342-2), storage volumes 344 that are logically configured on non-volatile storage media of the storage system 340, a local discovery system 346 which maintains and utilizes discovery log data 348 regarding a current operating state and connectivity information of the storage system 340. The storage system 350 comprises a plurality of ports P0, P1, P2, P3, and P4, a plurality of I/O controllers 352 (including at least a first I/O controller 352-1, and a second I/O controller 352-2), storage volumes 354 that are logically configured on non-volatile storage media of the storage system 350, a local discovery system 356 which maintains and utilizes discovery log data 358 regarding a current operating state and connectivity information of the storage system 350.

On the host system 310, the multipath driver 312 controls multipath access of the host system 310 to the storage systems 340 and 350 using known methods. For example, the multipath driver 312 is configured to direct I/Os through the volume paths, automatically identify redundant I/O paths, and automatically reroute I/Os to an alternate path when, e.g., a storage controller or storage node fails or all data paths to a given storage system or storage controller fail. In addition, the multipath driver 312 checks the status of known paths to a given storage volume, and provides load balancing of I/O requests between the available paths. In this regard, the multipath driver 312 manages the paths from the host system 310 to volumes on storage systems 340 and 350 through specific host ports and the storage ports specified or otherwise assigned to the host system 310 by the local discovery systems 346 and 356 and/or the central discovery system 330. The host system 310 manages the connections between a host port and a storage port, where the host system 310 obtains a list of storage ports through, e.g., discovery, and then connects to one or more of the storage ports obtained through discovery.

The network interfaces 314 and 316 of the host system 310 can be implemented using various types of adaptors that are commonly used in computer or storage networks to connect a host system to storage and/or network devices, depending on the storage environment. For example, network interfaces 314 and 316 may comprise host bus adapters (HBAs), network interface cards (NICs), converged network adaptors (CNAs), etc. An HBA enables I/O processing and provides physical connection between the host system and storage or network devices (e.g., network switches 322 and 324) in a SAN environment. The HBA can be utilized for Fibre Channel and iSCSI protocol enabled connections. An NIC can be used for an Ethernet-based network environment. A CNA converges the functions of an HBA with NIC in a single adaptor.

On the storage system 340, the port P0 is utilized by the host system 310 to connect to the local discovery system 346 (e.g., discovery subsystem) and associated discovery controller (e.g., persistent discovery controller) and obtain connection information for connecting to one or more ports P1, P2, P3, P4, etc., to access one or more storage volumes 344 through one or more allocated I/O controllers 342. Similarly, on the storage system 350, the port P0 is utilized by the host system 310 to connect to the local discovery system 356 (e.g., discovery subsystem) and associated discovery controller (e.g., persistent discovery controller) and obtain connection information for connecting to one or more ports P1, P2, P3, P4, etc., to access one or more storage volumes 354 through one or more allocated I/O controllers 352.

In some embodiments, in the context of NVMe, in response to receiving a discovery request (e.g., Get Log Page command) from the host system 310, the discovery system 346 will access the discovery log data 348 and return discovery log data to the host system 310 in a Discovery Log Page. The Discovery Log Page provides specific information regarding the current resources of the storage system 340 (e.g., NVMe subsystems) and storage endpoints (ports) to which the host system 310 can access to connect to one or more I/O controllers 342 using a connect command. For example, a Discovery Log Page comprises information including, but not limited to, NVMe transport type (e.g., RDMA, for FC, TCP), address family (e.g., IPv4, IPv6, InfiniBand, FC), one or more Port IDs, Transport Address (address for a connect command), etc. Similarly, in response to receiving a discovery request (e.g., Get Log Page command) from the host system 310, the discovery system 356 will access the discovery log data 358 and return discovery log data to the host system 310 in a Discovery Log Page.

For ease of illustration and explanation, the storage systems 340 and 350 are shown to have at least four ports P1, P2, P3, and P4, and at least two I/O controllers. However, each storage system 340 and 350 may have any number of ports, e.g., 2 ports, 8 ports, 16 ports, etc. In some embodiments, each port is associated with at least one I/O controller of the storage system. In other embodiments, each I/O controller of a given storage system is associated with groups of two or more ports. Moreover, in some embodiments the I/O controllers of a given storage system can share a given port of the storage system.

FIG. 3A schematically illustrates a fabric connect configuration, wherein the host system 310 can have at least two connections to each network switch 322 and 324, and wherein each network switch 322 and 324 can connect to each port P0, P1, P2, P3 and P4 of each storage system 340 and 350. In this configuration, there exists multiple physical paths through which the host system 310 can connect to each storage system 340 and 350, where all available paths are depicted in FIG. 3A as dashed lines. However, as noted above, the host connectivity management systems of the storage systems 340 and 350 are configured to control the connectivity of the host system 310 to the storage systems 340 and 350. For example, the host connectivity management systems of the storage systems 340 and 350 utilize control logic (e.g., port assignment control module 220, FIG. 2) to determine which system ports the host system 310 should connect to, and then utilize the discovery system (e.g., NVMe discovery protocol) to provide the host system 310 with a list of those system ports. The host system 310 connects to the storage system ports reported in the discovery log page, and disconnect from storage system ports that are not listed in the discovery log page.

Figure 3B:
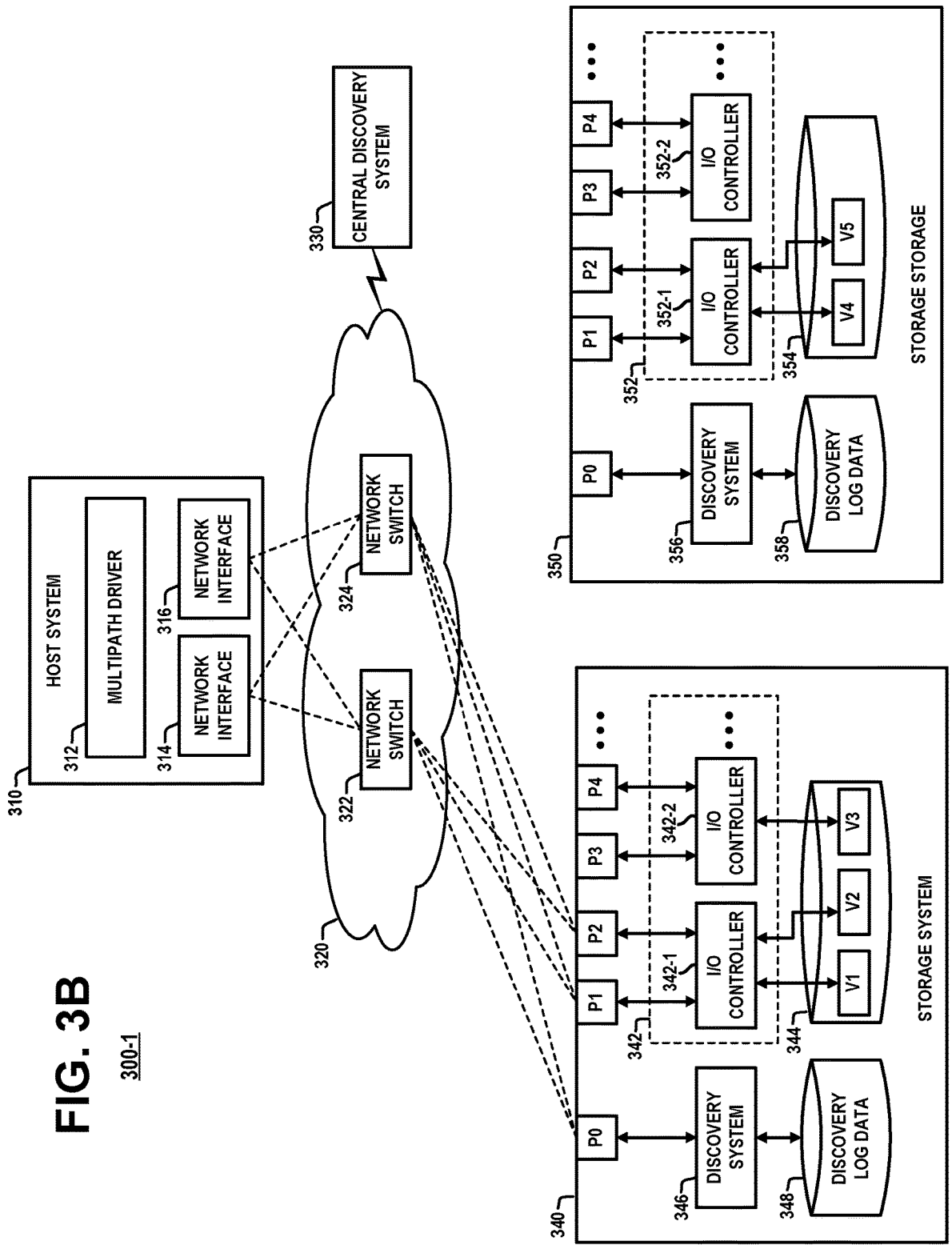
Figure 3C:
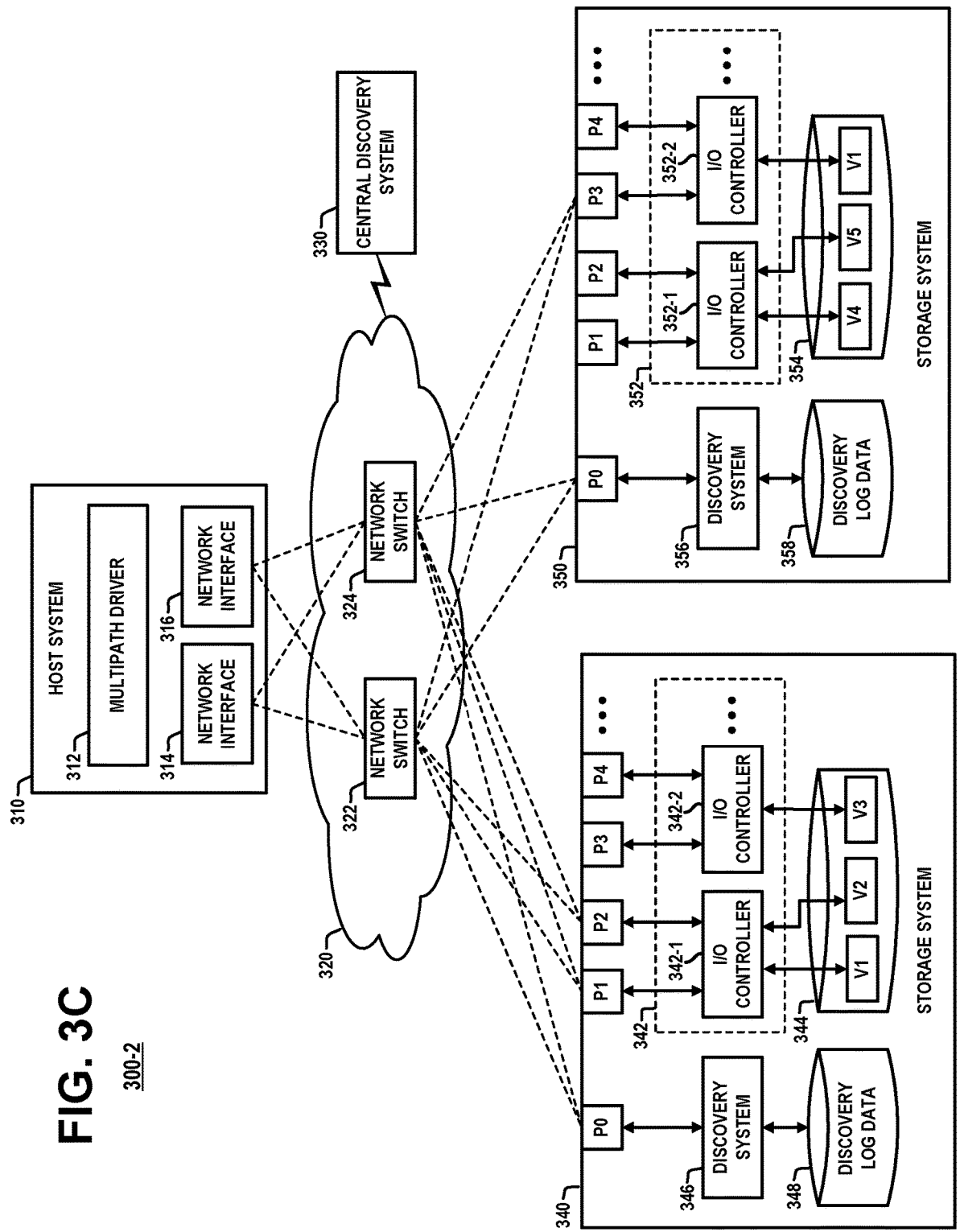
Figure 3D:
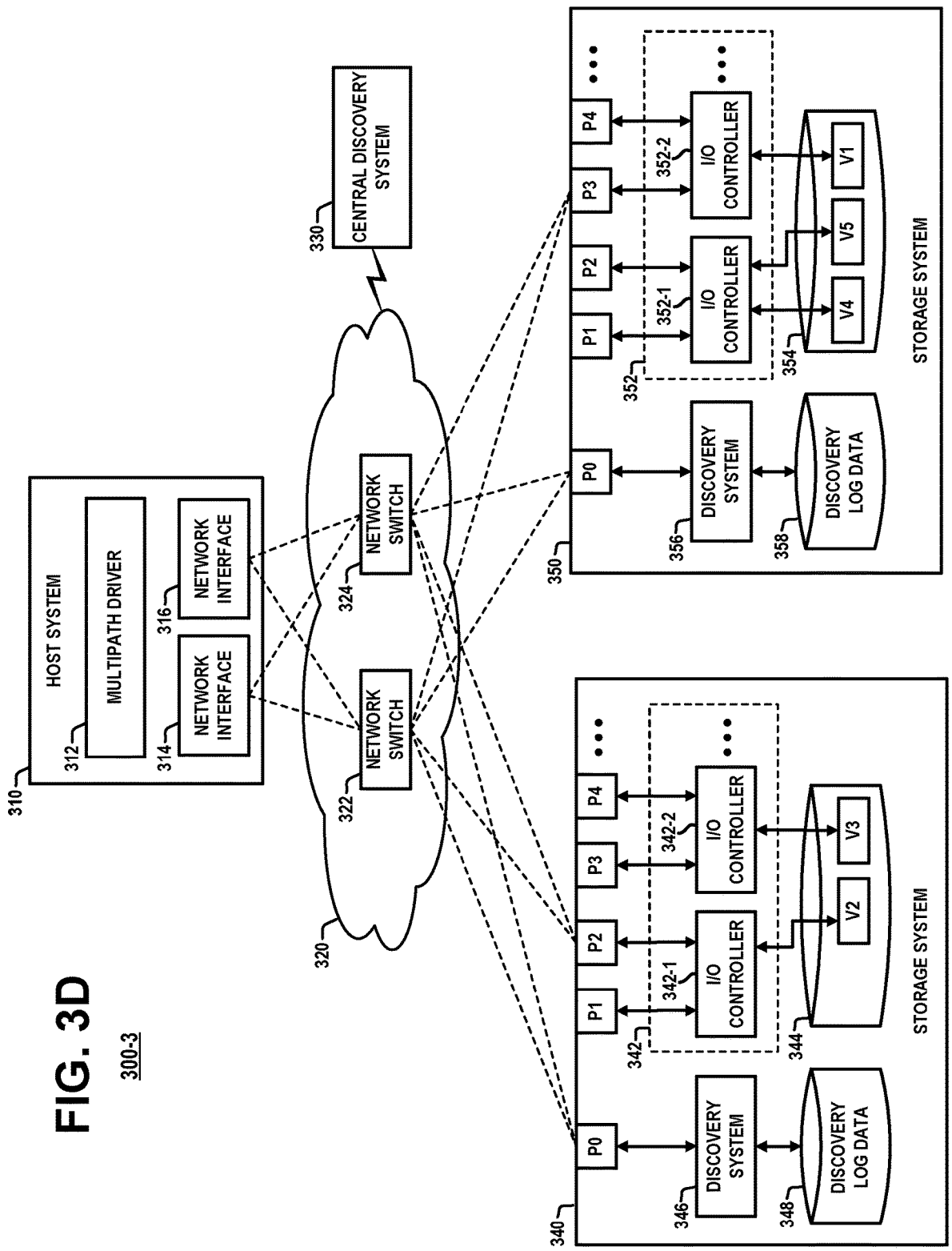

FIGS. 3B, 3C, and 3D schematically illustrate different states of the network computing environment 300 during different stages of a non-disruptive migration process, according to an exemplary embodiment of the disclosure. In particular, FIG. 3B schematically illustrates a connection configuration 300-1 of the network computing environment 300 at an initial phase of a non-disruptive migration process where the host system 310 is connected to ports P0, P1, and P2 of the storage system 340 (source storage system of migration process). More specifically, in the exemplary configuration, it is assumed that the host system 310 is (i) connected to a persistent discovery controller of the discovery system 346 through the port P0, (ii) connected to a first volume V1 through the port P1 and the I/O controller 342-1, and (iii) connected to a second volume V2 through the port P3 and the I/O controller 342-1. In addition, FIG. 3B shows that the connections of the host system 310 to the ports P0, P1, and P2 comprises multipath connections. In the exemplary embodiment of FIG. 3B, the I/O controller 342-2 is shown to be connected to a third volume V3, which is assumed to be used by another host system (not shown). A non-disruptive migration process is commenced to migrate the first volume V1 of the storage system 340 (or source storage system 340) to the storage system 350 (or target storage system 350).

Next, FIG. 3C schematically illustrates a connection configuration 300-2 of the network computing environment 300 at an intermediate phase of the non-disruptive migration process where the host system 310 is connected to ports PO and P3 of the target storage system 350. In this stage, it is assumed that a target volume V1 (corresponding to the source volume V1 on the source storage system 340) has been provisioned and included in the storage volumes 354 of target storage system 350, and that the host system 310 has access to the target volume V1 on the target storage system 350, so that that the host system 310 has access to the migrating volume V1 on both the source and target storage systems 340 and 350. In addition, in the exemplary configuration 300-2 of FIG. 3C, it is assumed that the host system 310 is (i) connected to a persistent discovery controller of the discovery system 356 through the port PO, and (ii) connected to the target volume V1 through the port P3 and the I/O controller 352-2. In addition, FIG. 3C shows that the connections of the host system 310 to the ports PO and P3 of the target storage system 350 comprises multipath connections. In the exemplary embodiment of FIG. 3C, the I/O controller 352-1 is shown to be connected to fourth and fifth volume V4 and V5, which are assumed to be used by another host system (not shown).

Next, FIG. 3D schematically illustrates a connection configuration of the network computing environment 300 at a final phase of the non-disruptive migration process where the host system 310 is disconnected from the port P1 of the source storage system 340, and the source volume VI is removed from the source storage system 340. In this stage of the migration process, it is assumed that the source volume VI on the source storage system 340 has been successfully migrated to the target storage system 350, allowing the source volume V1 to be removed from the source storage system 340, and enabling the host system 310 to disconnect from the port P1 in response to update discovery information provided to the host system 310 by the discovery system 346 of the source storage system 340 in the final stage of the non-disruptive migration process. As explained in further detail below with reference to FIGS. 4, 5A, 5B, 5C, a storage system-driven host connectivity management process is utilized to control connections of the host system 310 to source and target storage systems 340 and 350 during the non-disruptive migration process.

Figure 4:
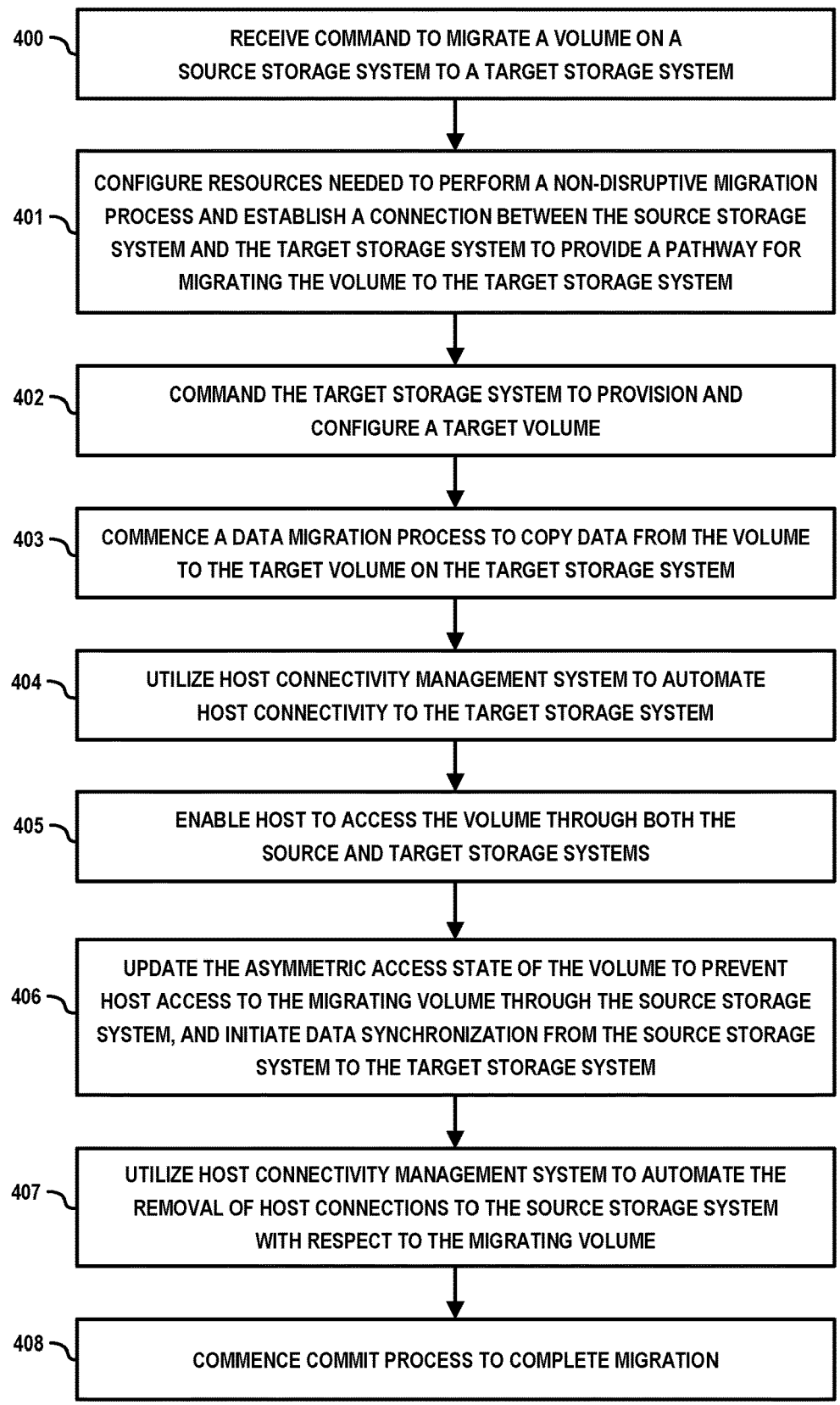
FIG. 4 is a flow diagram of a method for performing non-disruptive migration in a data storage system, according to an exemplary embodiment of the disclosure.

FIG. 4 is a flow diagram of a method for performing non-disruptive migration in a data storage system, according to an exemplary embodiment of the disclosure. In particular, FIG. 4 illustrates a method for performing a non-disruptive migration process in which a host connectivity management system is utilized to automatically manage host connections to source and target storage systems as part of the non-disruptive migration process, according to an exemplary embodiment of the disclosure. In some embodiments, FIG. 4 illustrates exemplary modes of operation of the host connectivity management system 150 and the non-disruptive migration system 162 of FIG. 1. In addition, for illustrative purposes, the process flow of FIG. 4 will be discussed in the context of the exemplary migration process as schematically illustrated in FIGS. 3B and 3C, wherein the storage system 340 is deemed a source storage system, and the storage system 350 is deemed a target storage system.

Referring to FIG. 4, the source storage system receives a command to migrate a given volume (source volume) on the source storage system to a target storage system (block 400). For example, in some embodiments, the non-disruptive data migration system (operating on the source storage system) receives a migration request which is manually issued by an administrator (e.g., via the migration control interface 182, FIG. 1), or automatically issued by some control process or system. For illustrative purposes, it is assumed that prior to the migration process, a given host is connected to the source storage system and accessing the source volume which is to be migrated. For example, in the illustrative embodiment of FIG. 3B, the host system 310 is connected to the first port P1 of the source storage system 340 and is accessing the volume V1 through the I/O controller 342-1.

In response to the migration request, the source storage system (via operation of non- disruptive data migration system) configures the resources needed to perform the non-disruptive migration process and to establish a connection between the source storage system and the target storage system to provide a pathway for migrating the source volume to the target storage system (block 401). For the configuration process, it is assumed that the source and target storage systems are configured to support non-disruptive migration operations and that a useable pathway for data migration is available between the source and target storage systems. The type of connection between the source and target systems will vary depending on, e.g., the location of the source and target storage systems (e.g., whether the source and target storage systems are located on a same storage network in same data center or local computing system, or remotely located in different data centers or different computing systems, remote from each other, etc.).

The source storage system commands the target storage system to create a target volume on the target storage system (block 402). For example, in some embodiments, the non-disruptive migration system (executing on the source storage system) determines the storage configuration of the source volume on the source storage system, and then commands the non-disruptive migration system (executing on the target storage system) to provision an equivalent configuration of a target volume on the target storage system. Next, the source storage system commences a data migration process to copy the data of the source volume to the target volume on the target storage system (block 403). The source storage system then proceeds to utilize the host connectivity management system to automate the host connectivity to the target storage system (block 404). The automated host connectivity process is commenced either during the data copy process, or after the data has been copied from the source volume to the target volume. The automated host connectivity process will vary depending on, e.g., the discovery service configuration of the storage system (e.g., local discovery controllers and/or central discovery controller), and other system configurations. Exemplary methods for performing the automated host connectivity process (block 404) will be discussed in further detail below in conjunction with FIGS. 5A and 5B.

Furthermore, once the source storage system confirms that the host is connected to the target storage system, a process is performed to enable host access to the migrating volume through both the source and target storage systems (block 405). For example, in some embodiments, the source storage system transmits a "reservation" to the target storage system to set a reservation on the target volume. For example, in some embodiments, the reservation comprises an NVMe reservation, a SCSI reservation, an SCSI-3 persistent reservation, or other types of similar protocols that are suitable for the given application and storage environment. In all instances, the reservation is used to control host access to a given volume or namespace, etc. An NVMe reservation or SCSI-3 persistent reservation on a given volume or namespace restricts host access to the given volume or namespace. An NVMe reservation requires an association between a host ID and a given volume ID or namespace ID. A host may be associated with multiple I/O controllers by registering the same Host ID with each controller it is associated with. A host ID allows the storage system to identify I/O controllers associated with the host having said host ID and preserve reservation properties across these controllers.

After setting the reservation(s), the identity of the target volume is set to the identity of the source volume, and the target storage system exposes the migrating volume to the host. At this point, the host has access to the volume through both the source storage system and the target storage system. For example, as noted above, FIG. 3C schematically illustrates a state of the non-disruptive migration process in which the source storage system 340 and target storage system 350 have a source volume and target volume with the same volume ID, denoted V1. In addition, FIG. 3C shows an exemplary state in which the host system 310 has access to the source volume V1 on the source storage system 340 through the port P1 and the I/O controller 342-1, as well as access to the corresponding target volume V1 on the target storage system 350 through the port P3 and the I/O controller 352-2.

In some embodiments, with this process, the device information of the target volume is matched with the device information of the source volume, so that the paired source and target devices appear to the host as a single virtual device across the source and target storage systems, and allow the host to access (read/write) data in both the source and target volumes during the migration process. For example, the target devices are assigned the identity of the source devices and are configured in a pass-through mode that allows the data to be accessed from both the source and target devices. By matching the device information of the target volume with the source volume, the host can recognize the source and target volumes as the same volume. Until the data migration is completed, data consistency is ensured because the data remains in the source volume for consolidated management after the connection between the source volume and the host is disconnected. For example, I/O issued by the host will be directed to either the source storage system or the target storage system through multi-pathing software of the host, but the system will ensure that all I/Os that are directed to the target storage system by the host are actually serviced by the source storage system until a migration "cleanup" process (or cutover process) is initiated.

In some embodiments, as part of a migration cleanup process, the source and target storage systems update the asymmetric access state of the volume to prevent host access to the migrating volume through the source storage system, and initiate data synchronization from the source storage system to the target storage system (block 406). With this process, the source storage system stops exposing the migrating volume, and makes the paths to the source storage system inactive so that all I/Os to the migrating volume are serviced by the target storage system. At this point, the source storage system can remove/delete the source volume.

Furthermore, as part of the migration cleanup process, the source storage system proceeds to utilize the host connectivity management system to automate the removal of the host connections to the source storage system with respect to the migrating volume (block 407), and the source volume on the source storage system is removed. For example, as shown in the illustrative embodiment of FIG. 3D, the automated process (of block 407) results in the host system 310 disconnecting from port P1 of the source storage system 340, followed by the removal of the volume V1 on the source storage system 340. With this process, the host connections to port P2 of the source storage system 340 are maintained for the host system 310 to access the volume V2 through the I/O controller 342-1. The automated host connectivity process for disconnecting the host from the source storage system (block 407) will vary depending on, e.g., the discovery service configuration of system (e.g., local discovery controllers and/or central discovery controller), and other system configurations. Exemplary methods for performing the automated host connectivity process to disconnect the host from the source storage system (block 407) will be discussed in further detail below in conjunction with FIG. 5C.

Following host disconnection from the source volume, the source storage system commences a commit process to complete the migration process (block 408). More specifically, after the source to target data synchronization is complete and all application data has been migrated to the target system, a commit operation is performed to release the temporary resources allocated to perform the migration, and to remove the system-to-system connection configured for the data migration pathway.

Figure 5A:
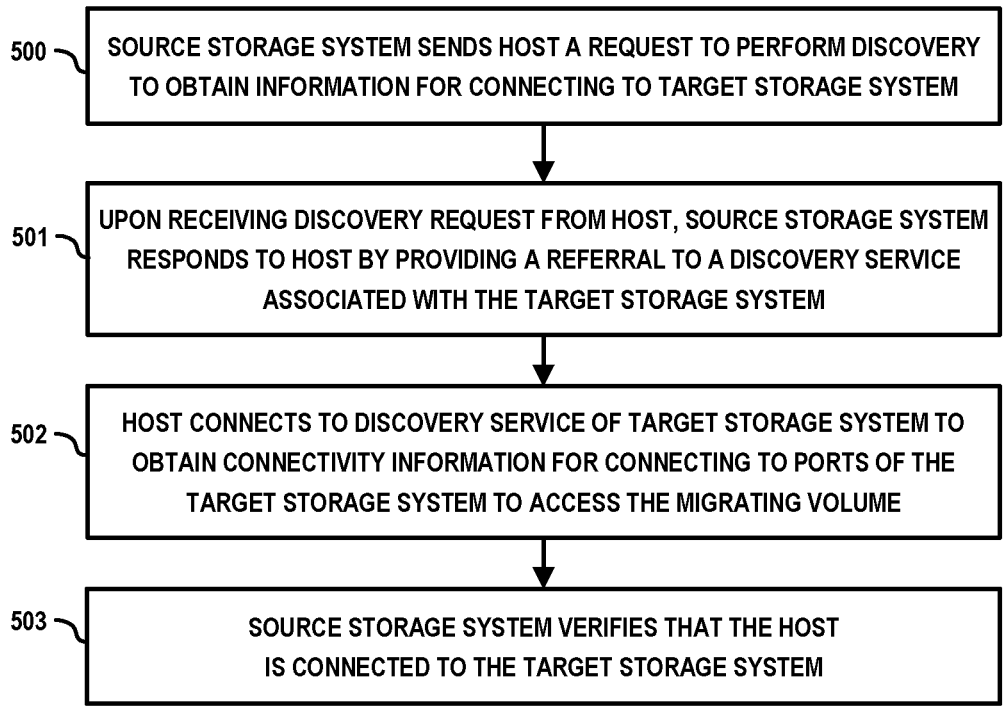
FIG. 5A illustrates a flow diagram of a method for automatically managing host connectivity to a target storage system during a non-disruptive migration process, according to an exemplary embodiment of the disclosure.

FIG. 5A illustrates a flow diagram of a method for automatically managing host connectivity to a target storage system during a non-disruptive migration process, according to an exemplary embodiment of the disclosure. More specifically, as noted above, FIG. 5A illustrates an exemplary automated process for enabling the host to connect to the target storage system (block 404) during the non-disruptive migration process of FIG. 4. As an initial step, the source storage system sends the host a request to perform discovery to obtain information for connecting to the target storage system (block 500). For example, in some embodiments, for NVMe, the source storage system sends the host a request to read an updated NVMe discovery log page. More specifically, in some embodiments, when the host remains connected to the local discovery system of the source storage system using a persistent discovery controller, the source storage system can send an asynchronous event request to the host indicating a change in the discovery information. In other embodiments, the source storage system can send a notification message (e.g., alert message) to the host requesting a manual rediscovery operation to be triggered on the host.

In response to the request, the host will send a discovery request to the source storage system to allow the host to discover one or more paths to the target volume on the target storage system. In some embodiments, for an NVMe-oF storage system, the host can send a "Get Log Page" request to the discovery system of the source storage system. In other embodiments, for an iSCSI storage system, the host can send a "SendTargets" request to the discovery system of the source storage system. Upon receiving the discovery request from the host, the source storage system (via the local discovery system on the source storage system) will respond by providing the host a referral to a discovery system associated with the target storage system (block 501). For example, in some embodiments, the source storage system will send the host a referral to the local discovery system of the target storage system. In this instance, the host is expected to follow the referral provided in the response message (e.g., the discovery log page (for NVMe-oF), the SendTargets response message (or iSCSI), etc.) and connect to the discovery system of the target storage system.

The host will connect to the discovery system of the target storage system to obtain connectivity information for connecting to one or more ports of the target storage system to access the migrating volume on the target storage system (block 502). For example, for NVMe-oF, when the host connects to the local discovery system of the target storage system, the discovery system of the target storage system will return a response message (e.g., discovery log page, etc.) to the host, wherein the response message comprises a list of one or more ports of the target storage system to which the host should connect to perform I/O to the migrating volume. The host connects to the ports reported in the returned response message. It is to be noted that in some instances, the host may already be connected to the target storage system for accessing other volumes. In this regard, it is possible that no change in the host connectivity to the target storage system is needed for the host to access the migrating volume. The automated connection process is deemed complete when the source storage system verifies that the host is connected to the target storage system (block 503).

Figure 5B:
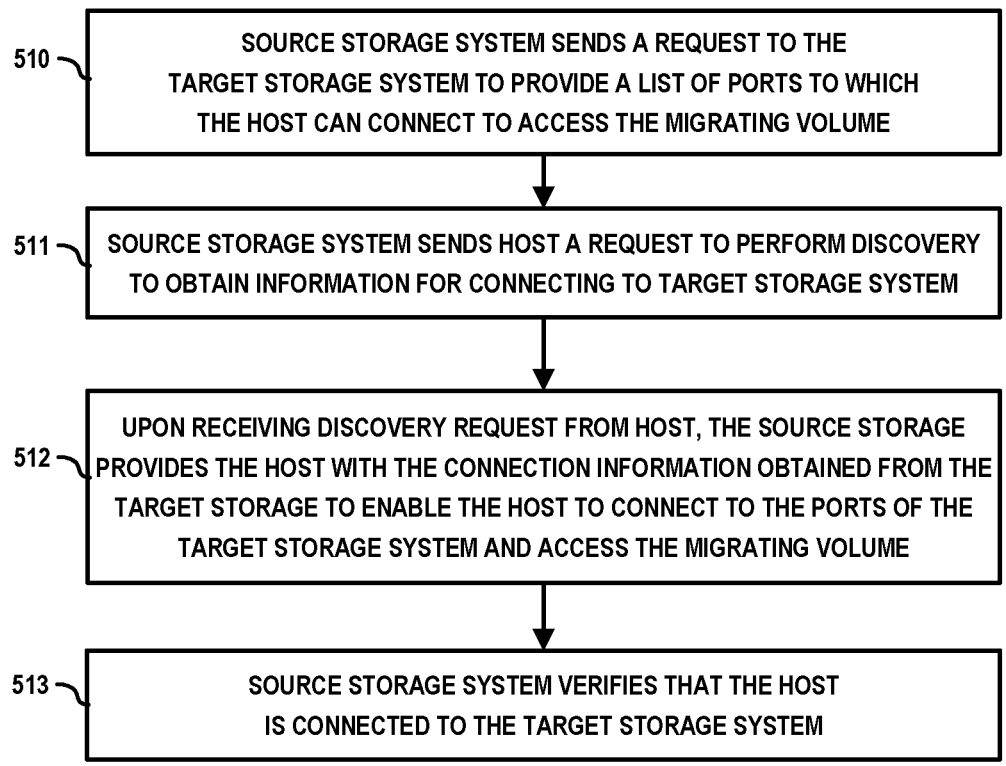
FIG. 5B illustrates a flow diagram of a method for automatically managing host connectivity to a target storage system during a non-disruptive migration process, according to another exemplary embodiment of the disclosure.

FIG. 5B illustrates a flow diagram of a method for automatically managing host connectivity to a target storage system during a non-disruptive migration process, according to another exemplary embodiment of the disclosure. More specifically, as noted above, FIG. 5B illustrates another exemplary automated process for enabling the host to connect to the target storage system (block 404) during the non-disruptive migration process of FIG. 4. As an initial step, the source storage system sends a request to the target storage system to provide a list of ports to which the host should connect to access the migrating volume (block 510). For example, in some embodiments, the local discovery system of the source storage system sends a request to the local discovery system of the target storage system requesting such connection information.

The target storage system sends the source storage system a response message which includes the connection information (e.g., list of ports on the target storage system), and the discovery system of the source storage system sends the host a request to perform discovery to obtain information for connecting to the target storage system (block 511). For example, in some embodiments, the source storage system sends the host a request to read an updated NVMe discovery log page. Further, in some embodiments, when the host remains connected to the local discovery system of the source storage system using a persistent discovery controller, the source storage system can send an asynchronous event request to the host indicating a change in the discovery information. In other embodiments, the source storage system can send a notification message (e.g., alert message) to the host requesting a manual rediscovery operation to be triggered on the host.

In response to the request, the host will send a discovery request (e.g., "Get Log Page" request, "SendTargets" request, etc.) to the source storage system to allow the host to discover one or more paths to the target volume on the target storage system. Upon receiving the discovery request from the host, the source storage system (via the local discovery system on the source storage system) responds to the host by providing connection information which includes both the source system ports to which the host is connected and the list of target ports of the target storage system that were obtained from the discovery system of the target storage system (block 512), and the host utilizes the connection information to connect to the target storage system to access the migrating volume through the target storage system. The target storage system reports to the source storage system when the host is successfully connected to an I/O controller of the target storage system, which allows the source storage system to verify that the host is connected to the target storage system (block 513).

Figure 5C:
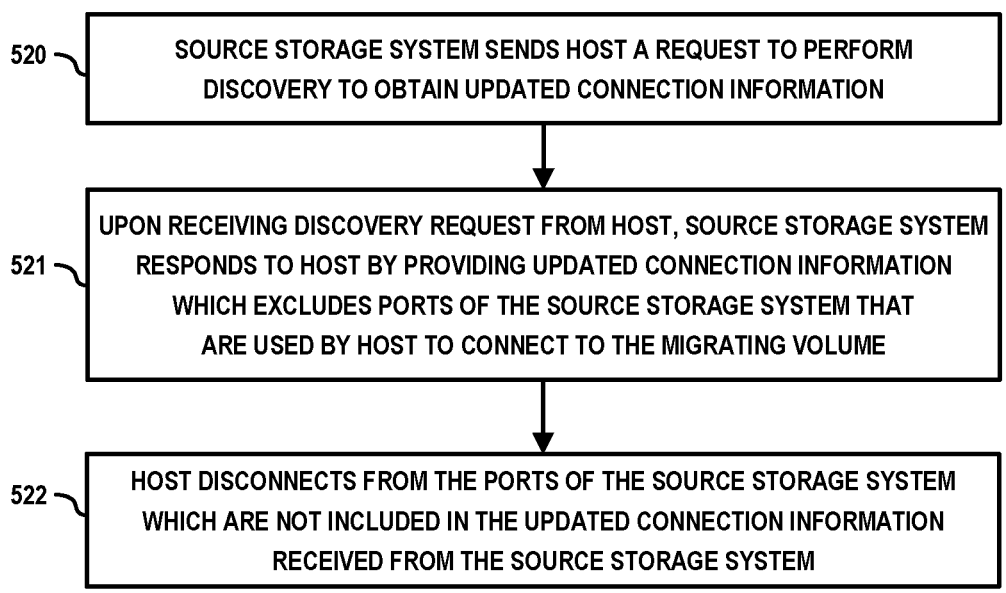
FIG. 5C illustrates a flow diagram of a method for automatically managing host connectivity to a source storage system during a non-disruptive migration process, according to an exemplary embodiment of the disclosure.

FIG. 5C illustrates a flow diagram of a method for automatically managing host connectivity to a source storage system during a non-disruptive migration process, according to an exemplary embodiment of the disclosure. More specifically, as noted above, FIG. 5C illustrates an exemplary automated process to enable the host to disconnect from one or more ports of the source storage system (block 407) during the non-disruptive migration process of FIG. 4. As an initial step, the source storage system sends the host a request (or notification) to perform discovery to obtain updated connection information for connecting to the source storage system (block 520). For example, in some embodiments, the source storage system sends the host a request to read an updated NVMe discovery log page. Further, in some embodiments, when the host remains connected to the local discovery system of the source storage system using a persistent discovery controller, the source storage system can send an asynchronous event request to the host indicating a change in the discovery information, which triggers the host to send a discovery request to the discovery system of the source storage system. In other embodiments, the source storage system can send a notification message (e.g., alert message) to the host requesting a manual rediscovery operation to be triggered on the host.

In response to the request, the host will send a discovery request (e.g., "Get Log Page" request, "SendTargets" request, etc.) to the source storage system to obtain updated connection information to the source target system. Upon receiving the discovery request from the host, the source storage system (via the local discovery system on the source storage system) responds to the host by providing updated connection information which excludes the ports of the source storage system to which the host is connected for accessing the migrating volume (block 521). For example, in some embodiments, the discovery system of the source storage system will send the host an updated discovery log page, which excludes the ports of the source storage system that the host should no longer connect to for accessing the migrating volume. There are instances where the host may need to remain connected to the source storage system to access one or more volumes on the source storage system, or it may no longer require connectivity through some, or all, of the source system ports to which it was previously connected. The discovery system of the source storage system takes this into account when determining which ports should be included or removed from the discovery log page. The host is expected to follow the updated connection information (e.g., updated discovery log page) provided by the source storage system and disconnect from the ports of the source storage system which are not included in the updated connection information received from the source storage system (block 522).

The process flows of FIGS. 4, 5A, 5B, and 5C illustrate an exemplary process flow for non-disruptive migration which can be achieved with a single user command to the source storage system, wherein the migration process is then controlled by the storage system until it is concluded. The use of the storage system-driven host connectivity management to automate the connectivity updates of the host system to the source and target storage systems during the non-disruptive migration process simplifies the volume migration operation from the user perspective and significantly reduces the risk of user error which may lead to loss of access. It allows the orchestration to happen from one place, e.g., the source system and removes the need for the user to access the other system, e.g., target system to update the connectivity.

Figure 6:
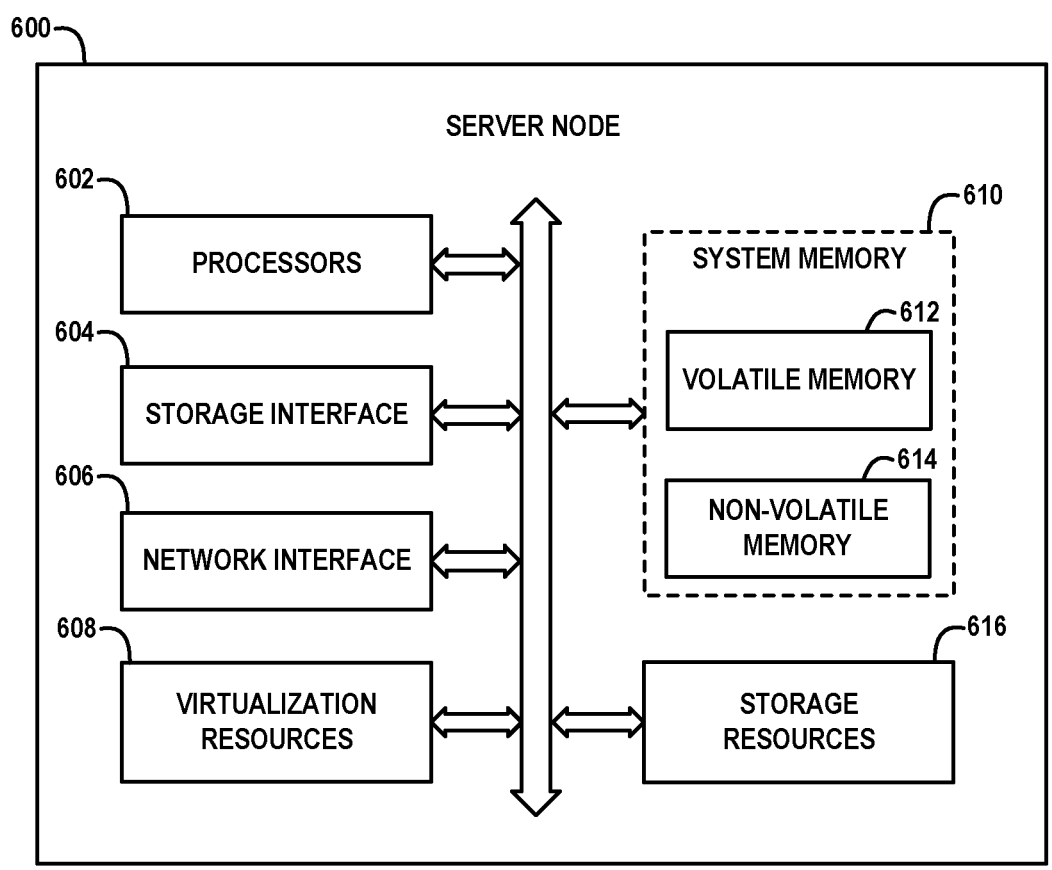
FIG. 6 schematically illustrates a framework of a storage server node for implementing a storage system and associated host connectivity management system, according to an exemplary embodiment of the disclosure.

FIG. 6 schematically illustrates a framework of a storage server node for implementing a storage system and associated host connectivity management system, according to an exemplary embodiment of the disclosure. In some embodiments, FIG. 6 illustrates an exemplary embodiment of server node 600 which comprises processors 602, storage interface circuitry 604, network interface circuitry 606, virtualization resources 608, system memory 610, and storage resources 616. The system memory 610 comprises volatile memory 612 and non-volatile memory 614. The processors 602 comprise one or more types of hardware processors that are configured to process program instructions and data to execute a native operating system (OS) and applications that run on the server node 600.

For example, the processors 602 may comprise one or more CPUs, microprocessors, microcontrollers, application specific integrated circuits (ASICs), field programmable gate systems (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 606 enables the server node 600 to interface and communicate with a network and other system components. The network interface circuitry 606 comprises network controllers such as network cards and resources (e.g., network interface controllers (e.g., Smart-NICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more service or functions which are hosted by the server node 600. For example, the virtualization resources 608 can be configured to implement the various modules and functionalities of a host connectivity management system and non-disruptive migration control system as discussed herein. In some embodiments, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In other embodiments, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well execute one or more of the various modules and functionalities as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the various components of the host connectivity management system 200 (FIG. 2) and the non-disruptive migration system 162 (FIG. 1) comprise program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage system or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of next generation non-volatile memory (NGNVM) devices. The system memory 610 can be implemented using a hierarchical memory tier structure wherein the volatile memory 612 is configured as the highest-level memory tier, and the non-volatile memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
   receiving, by a first storage system, a request to migrate a source volume from the first storage system to a second storage system;
   commencing, by the first storage system, a migration process for non-disruptively migrating the source volume from the first storage system to a target volume on the second storage system;
   sending, by the first storage system, a first request to a host system to cause the host system to discover information that enables the host system to connect to the second storage system to access the target volume through the second storage system during the migration process;
   performing, by the first storage system, a process to enable the host system to access the source volume on the first storage system and to access the target volume on the second storage system during the migration process, the process comprising the first storage system sending a reservation request to the second storage system to cause a volume identifier to be assigned to the target volume, which is a same volume identifier of the source volume, to cause an associated host identifier of the host system to be assigned to the target volume, and to cause the target volume to be exposed to the host system having the associated host identifier; and
   sending, by the first storage system, a second request to the host system to cause the host system to discover information that enables the host system to disconnect from the source volume on the first storage system.

2. The method of claim 1, wherein sending the first request to the host system to cause the host system to discover information that enables the host system to connect to the second storage system comprises:
   sending, by the first storage system, a request to the host system to cause the host system to send a discovery request to a discovery system associated with the first storage system; and
   in response to the discovery system associated with the first storage system receiving the discovery request from the host system, sending the host system a referral to a discovery system associated with the second storage system to allow the host system to discover information for connecting to the second storage system.

3. The method of claim 2, wherein sending the request to the host system to cause the host system to send a discovery request to the discovery system associated with the first storage system comprises sending, by the first storage system, an asynchronous event notification to the host system from a persistent discovery controller of the discovery system.

4. The method of claim 1, wherein sending the first request to the host system to cause the host system to discover information that enables the host system to connect to the second storage system comprises:
   sending, by the first storage system, a request to the host system to cause the host system to send a discovery request to a discovery system associated with the first storage system; and
   in response to the discovery system of the first storage system receiving the discovery request from the host system, the discovery system of the first storage system sending the host system the information for connecting to the second storage system.

5. The method of claim 4, further comprising sending, by the first storage system, a request to a discovery system associated with the second storage system to obtain the information for connecting to the second storage system.

6. The method of claim 1, wherein sending the second request to the host system to cause the host system to discover information that enables the host system to disconnect from the source volume on first storage system comprises:
   sending, by the first storage system, a request to the host system to send a discovery request to a discovery system associated with the first storage system; and
   in response to the discovery system associated with the first storage system receiving the discovery request from the host system, sending the host system updated connection information for connecting to the first storage system, wherein the updated connection information causes the host system to disconnect from at least one port of the first storage system, which is not included in the updated connection information.

7. The method of claim 1, wherein commencing the migration process for non-disruptively migrating the source volume from the first storage system to the target volume on the second storage system, comprises:
   establishing, by the first storage system, a connection with the second storage system to provide a path for migrating the source volume from the first storage system to the second storage system;
   sending, by the first storage system, a request to the second storage system to configure the target volume on the second storage system; and
   sending, by the first storage system, a copy of data of the source volume for storage in the target volume.

8. An article of manufacture comprising a non-transitory processor-readable storage medium having stored therein program code of one or more software programs, wherein the program code is executable by one or more processors to implement a method which comprises:
   receiving, by a first storage system, a request to migrate a source volume from the first storage system to a second storage system;
   commencing, by the first storage system, a migration process for non-disruptively migrating the source volume from the first storage system to a target volume on the second storage system;
   sending, by the first storage system, a first request to a host system to cause the host system to discover information that enables the host system to connect to the second storage system to access the target volume through the second storage system during the migration process;

performing, by the first storage system, a process to enable the host system to access the source volume on the first storage system and to access the target volume on the second storage system during the migration process, the process comprising the first storage system sending a reservation request to the second storage system to cause a volume identifier to be assigned to the target volume, which is a same volume identifier of the source volume, to cause an associated host identifier of the host system to be assigned to the target volume, and to cause the target volume to be exposed to the host system having the associated host identifier; and sending, by the first storage system, a second request to the host system to cause the host system to discover information that enables the host system to disconnect from the source volume on the first storage system.

9. The article of manufacture of claim 8, wherein the program code for sending the first request to the host system to cause the host system to discover information that enables the host system to connect to the second storage system comprises program code for:

sending, by the first storage system, a request to the host system to cause the host system to send a discovery request to a discovery system associated with the first storage system; and in response to the discovery system associated with the first storage system receiving the discovery request from the host system, sending the host system a referral to a discovery system associated with the second storage system to allow the host system to discover information for connecting to the second storage system.

10. The article of manufacture of claim 9, wherein the program code for sending the request to the host system to cause the host system to send a discovery request to the discovery system associated with the first storage system comprises program code for sending, by the first storage system, an asynchronous event notification to the host system from a persistent discovery controller of the discovery system.

11. The article of manufacture of claim 9, wherein the program code for sending the first request to the host system to cause the host system to discover information that enables the host system to connect to the second storage system comprises program code for:

sending, by the first storage system, a request to the host system to cause the host system to send a discovery request to a discovery system associated with the first storage system; and in response to the discovery system of the first storage system receiving the discovery request from the host system, the discovery system of the first storage system sending the host system the information for connecting to the second storage system.

12. The article of manufacture of claim 11, further comprising program code for sending, by the first storage system, a request to a discovery system associated with the second storage system to obtain the information for connecting to the second storage system.

13. The article of manufacture of claim 8, wherein the program code for sending the second request to the host system to cause the host system to discover information that enables the host system to disconnect from the source volume on first storage system comprises program code for:

sending, by the first storage system, a request to the host system to cause the host system to send a discovery request to a discovery system associated with the first storage system; and in response to the discovery system associated with the first storage system receiving the discovery request from the host system, sending the host system updated connection information for connecting to the first storage system, wherein the updated connection information causes the host system to disconnect from at least one port of the first storage system, which is not included in the updated connection information.

14. An apparatus, comprising:

a first storage system comprising at least one processor, and a system memory configured to store program code, wherein the program code is executable by the at least one processor to configure the first storage system to:

receive a request to migrate a source volume from the first storage system to a second storage system;

commence a migration process for non-disruptively migrating the source volume from the first storage system to a target volume on the second storage system;

send a first request to a host system to cause the host system to discover information that enables the host system to connect to the second storage system to access the target volume through the second storage system during the migration process;

perform a process to enable the host system to access the source volume on the first storage system and to access the target volume on the second storage system during the migration process, the process comprising the first storage system sending a reservation request to the second storage system to cause a volume identifier to be assigned to the target volume, which is a same volume identifier of the source volume, to cause an associated host identifier of the host system to be assigned to the target volume, and to cause the target volume to be exposed to the host system having the associated host identifier; and send a second request to the host system to cause the host system to discover information that enables the host system to disconnect from the source volume on the first storage system.

15. The apparatus of claim 14, wherein in sending the first request to the host system to cause the host system to discover information that enables the host system to connect to the second storage system, the first storage system is configured to:

send a request to the host system to cause the host system to send a discovery request to a discovery system associated with the first storage system; and in response to the discovery system associated with the first storage system receiving the discovery request from the host system, send the host system a referral to a discovery system associated with the second storage system to allow the host system to discover information for connecting to the second storage system.

16. The apparatus of claim 15, wherein in sending the first request to the host system to cause the host system to discover information that enables the host system to connect to the second storage system, the first storage system is configured to:

send a request to a discovery system associated with the second storage system to obtain information for connecting to the second storage system;

send the host system a request to send a discovery request to a discovery system associated with the first storage system; and in response to the discovery system associated with the first storage system receiving the discovery request from the host system, the first storage system sends the host system the obtained information for connecting to the second storage system.

17. The apparatus of claim 14, wherein in sending the second request to the host system to cause the host system to discover information that enables the host system to disconnect from the source volume on first storage system, the first storage system is configured to:

send a request to the host system to cause the host system to send a discovery request to a discovery system associated with the first storage system; and in response to the discovery system associated with the first storage system receiving the discovery request from the host system, send the host system updated connection information for connecting to the first storage system, wherein the updated connection information causes the host system to disconnect from at least one port of the first storage system, which is not included in the updated connection information.

18. The method of claim 1, further comprising utilizing, by the first storage system, the source volume to service a data access request to the target volume, which is received by the second storage system from the host system during the migration process.

19. The article of manufacture of claim 8, further comprising program code which is executable by the one or more processors to configure the first storage system to utilize the source volume to service a data access request to the target volume, which is received by the second storage system from the host system during the migration process.

20. The apparatus of claim 14, wherein the first storage system is configured to utilize the source volume to service a data access request to the target volume, which is received by the second storage system from the host system during the migration process.

* * * * *